United States Patent Office 3,427,210
Patented Feb. 11, 1969

3,427,210
METHOD OF PRODUCING ALLOYS OF ZIRCONIUM WITH IRON, VANADIUM AND CHROMIUM FOR USE IN NUCLEAR REACTORS COOLED WITH AN ORGANIC COOLANT
Giancarlo Imarisio, Varese, Italy, assignor to European Atomic Energy Community (Euratom), Brussels, Belgium
No Drawing. Filed June 5, 1967, Ser. No. 643,398
Claims priority, application Germany, July 27, 1966,
E 32,153
U.S. Cl. 148—2  1 Claim
Int. Cl. C22f *1/18;* C22c *15/00*

ABSTRACT OF THE DISCLOSURE

A method of producing structural parts of an alloy consisting of iron, vanadium and chromium comprising the steps of twice melting the alloying constituents in a furnace, forging the alloy at about 1000° C., annealing at about 1000° C., quenching, repeating the forging, annealing and quenching, hot rolling, tempering, and cold rolling.

---

The invention relates to the use of alloys of zirconium with iron, vanadium and chromium in nuclear reactors cooled with an organic coolant.

Owing to its nuclear and chemical properties, zirconium is of special interest as structural material for the construction of parts of nuclear reactors. Owing to its chemical properties under conditions of reactor operation it is unsuitable for use in pure form because it corrodes at elevated temperature when exposed to water and terphenyl coolants and embrittles owing to the absorption of thermolytically and radiolytically formed hydrogen.

Extensive development work has been carried out, more particularly in the United States, in order to obtain zirconium alloys which are suitable in water-cooled reactors.

The corrosion and embrittlement conditions relating to zirconium and its alloys in water or steam at elevated temperatures are however entirely different from those which occur in reactors which employ organic coolants such as terphenyl mixtures so that the zirconium alloys provided for use in water-cooled reactors are found to be unsuitable for use in organically cooled reactors.

The aforementioned difference in the characteristics of zirconium and its alloys in water-steam systems on the one hand and in organic coolant systems on the other hand is due to the fact that zirconium reacts with water in accordance with the formula $$Zr + 2H_2O \rightarrow ZrO_2 + 4H$$

This reaction does not occur in practice in organic coolants because these operate with a maximum of only approximately 100 p.p.m. of $H_2O$ which has the positive effect of ensuring the formation of a protective oxide film on the alloy. On the other hand, water is thermolytically and radiolytically more stable than organic coolants so that thermolysis and radiolysis under conditions of reactor operation liberate more hydrogen from organic coolants than from water.

The hydrogen reacts with the zirconium forming zirconium hydride thus destroying the alloy structure.

The reaction mechanisms leading to corrosion and embrittlement of zirconium and its alloys are therefore very different—one coolant is polar, the other being non-polar—so that the development of efficient zirconium alloys for nuclear reactors cooled with organic materials had to proceed upon separate paths.

Terphenyl mixtures for use in nuclear applications also contain traces of organically bonded chlorine which is liberated under the conditions of reactor operation, and, in addition to combining with iron or aluminum of the structural reactor material in the presence of traces of water to form catalytically active Lewis acids which result in polymerisation or "fouling" of the coolant, also attacks the protective oxide film formed in zirconium by reaction with water, reduces its protective effect and thus encourages corrosion.

According to the invention it is proposed that alloys of the following composition be used for structural members intended for nuclear reactors using an organic coolant:

Alloy 1: 0.1–1.0% by weight Fe, 0.1–1% by weight vanadium, remainder zirconium;

Alloy 2: 0.4–1.5% by weight Cr, 0.06–0.5% by weight Fe, remainder zirconium;

Alloy 3: 1.0–1.5% by weight chromium, remainder zirconium.

Thus the invention provides a nuclear reactor employing an organic coolant having a structural part (or parts) of the reactor which is in contact with the coolant made of an alloy consisting of 0.1 to 1% iron, 0.1 to 1% vanadium, remainder zirconium or of 0.4 to 1.5% chromium, 0.06 to 0.5% iron, remainder zirconium or of 1 to 1.5% chromium, remainder zirconium, the percentages being by weight.

It is particularly advantageous in alloy 1 for iron and vanadium to be alloyed in identical or nearly identical percentages by weight.

Testing of sample alloys for their corrosion and embrittlement characteristics in commercial terphenyl mixtures under conditions disclosed in Table 1 indicated, as can be seen in Table 2, that they are superior to Zircalloy 2.

Sample alloys of the following compositions were employed:

Alloy 11: Fe, 0.75% by weight, V, 0.76% by weight, remainder, zirconium;

Alloy 21: Cr, 0.77% by weight, Fe, 0.33% by weight, remainder, zirconium;

Alloy 31: Cr, 1.4%, remainder, zirconium.

TABLE 1

| | Temperature, °C. | Concentration in p.p.m. | | Period of exposure, days |
|---|---|---|---|---|
| | | Water | Chlorinated compounds | |
| Experiment A | 380 | 25 | ≦0.2 | 150 |
| Experiment B | 400 | 25 | ≦0.2 | 150 |
| Experiment C | 380 | 25 | 0.5 | 150 |
| Experiment D | 400 | 25 | 0.5 | 150 |
| Experiment E | 420 | 25 | ≦0.2 | 150 |
| Experiment F | 400 | 100 | ≦0.2 | 173 |

TABLE 2

| | Alloy 11 [1] | | Alloy 21 [3] | | Alloy 31 | | Zircalloy-2 [2] | |
|---|---|---|---|---|---|---|---|---|
| | ΔO [4] | ΔH [5] | ΔO | ΔH | ΔO | ΔH | ΔO | ΔH |
| Experiment A | 0.04 | 0.02 | | | 0.04 | 0.15 | 0.08 | 0.74 |
| Experiment B | 0.08 | 0.008 | | | 0.08 | 0.3 | 0.12 | 1.24 |
| Experiment C | 0.04 | 0.054 | | | 0.02 | 0.17 | 0.14 | 0.9 |
| Experiment D | 0.2 | 0.21 | | | 0.10 | 0.41 | 0.08 | 1.54 |
| Experiment E | 0.12 | 0.036 | | | 0.14 | 0.38 | 0.6 | 2.7 |
| Experiment F | | | 0.125 | 0.066 | | | | |

[1] Test plate thickness, 1 mm.
[2] Test plate thickness, 0.5 mm.
[3] Test plate thickness, 1.2 mm.
[4] Weight increase, mg./dm.²/day.
[5] Hydrogen absorption, mg./day.

Accordingly, the use of the aforementioned alloys is found to be particularly advantageous in nuclear reactors cooled with terphenyls. It was also found that the method for producing the alloys to be employed in accordance with the invention affects their corrosion and embrittlement characteristics in organic coolants.

Thus it is advantageous if the alloying constituents are subjected to a double melting process in an arc furnace using total loss electrodes under a rare gas (e.g. argon) protective atmosphere. The alloy is then forged at about 1000° C., followed by solution annealing for about half hour at about 1000° C., finally followed by quenching in water.

After repeated forging at about 1000° C., half-hour solution annealing at about 1000° and quenching in water the material is subsequently hot rolled at about 700° C., then cold rolled, with intermediate tempering at about 650° C. The last tempering pass extends over three hours at about 650° C.

Conventional methods such as sand blasting and chemical pickling are also used where necessary.

The essential advantage disclosed by the invention is that it permits the advantages offered by zirconium as a structural material to be employed for nuclear reactors cooled by organic liquids.

What I claim is:

1. A method of producing structural parts for a nuclear reactor from an alloy selected from the group consisting, by weight, of 0.1 to 1% iron, 0.1 to 1% of vanadium with the remainder zirconium; 0.4 to 1.5% chromium, 0.06 to 0.5% iron and the remainder zirconium; 1 to 1.5% chromium and the remainder zirconium comprising the steps twice melting the alloy constituents in a furnace with a total loss electrode under a rare gas protective atmosphere, forging the alloy at about 1000° C., half-hour solution annealing at about 1000° C. and quenching in water, repeating the forging, annealing and quenching steps, hot rolling the alloy at about 700° C. and cold rolling with intermediate tempering passes at about 650° C. with the last tempering pass being extended about three hours at about 650° C.

References Cited

UNITED STATES PATENTS 3,303,065   2/1967   Reynolds _____ 148—11.5 X

OTHER REFERENCES

Reactive Metals, AIME Proceedings, Levy et al., May 1958, vol. 2, pp. 388–390.

CARL D. QUARFORTH, *Primary Examiner.*

M. J. SCOLNICK, *Assistant Examiner.*

U.S. Cl. X.R.

148—11.5; 75—135, 177